(12) United States Patent
Sinn et al.

(10) Patent No.: US 9,525,818 B2
(45) Date of Patent: Dec. 20, 2016

(54) AUTOMATIC TUNING OF IMAGES BASED ON METADATA

(71) Applicant: Adobe Systems Incorporated, San Jose, CA (US)

(72) Inventors: Richard P. Sinn, Milpitas, CA (US); Thomas T. Donahue, Carlsbad, CA (US)

(73) Assignee: Adobe Systems Incorporated, San Jose, CA (US)

( * ) Notice: Subject to any disclaimer, the term of this patent is extended or adjusted under 35 U.S.C. 154(b) by 115 days.

(21) Appl. No.: 13/953,434

(22) Filed: Jul. 29, 2013

(65) Prior Publication Data

US 2015/0029353 A1   Jan. 29, 2015

(51) Int. Cl.
*H04N 5/76* (2006.01)
*H04N 5/232* (2006.01)

(52) U.S. Cl.
CPC .......... *H04N 5/23229* (2013.01); *H04N 5/232* (2013.01)

(58) Field of Classification Search
CPC ..................... H04N 1/2116; H04N 21/4223
USPC .......................................... 348/231.99, 207.1
See application file for complete search history.

(56) References Cited

U.S. PATENT DOCUMENTS

| | | | | |
|---|---|---|---|---|
| 5,296,884 | A * | 3/1994 | Honda et al. ................. 396/311 |
| 7,525,578 | B1 * | 4/2009 | Barbeau ............... H04N 9/8205 |
| | | | | 348/211.2 |
| 2001/0045988 | A1 * | 11/2001 | Yamauchi ............. H04N 19/42 |
| | | | | 348/273 |
| 2003/0078928 | A1 * | 4/2003 | Dorosario .............. G06Q 30/02 |
| 2003/0122842 | A1 * | 7/2003 | Newman .................. G09G 5/02 |
| | | | | 345/589 |
| 2005/0086391 | A1 * | 4/2005 | Chu ........................ G06F 21/10 |
| | | | | 710/1 |
| 2007/0063998 | A1 * | 3/2007 | Mahesh ................ G06F 19/321 |
| | | | | 345/419 |
| 2010/0094936 | A1 * | 4/2010 | Simonen ................ G06T 19/00 |
| | | | | 709/204 |
| 2010/0169074 | A1 * | 7/2010 | Hung .................... G06F 17/243 |
| | | | | 704/8 |
| 2010/0191728 | A1 * | 7/2010 | Reilly ............... G06F 17/30265 |
| | | | | 707/736 |

\* cited by examiner

*Primary Examiner* — Twyler Haskins
*Assistant Examiner* — Wesley Chiu
(74) *Attorney, Agent, or Firm* — Wolfe-SBMC

(57) ABSTRACT

Automatic techniques to tune images based on metadata are described. In one or more implementations, image data and metadata are received that references a geographic location. Responsive to a user input, the image data is processed using one or more tuning parameters that correspond to the geographic location to change one or more visual characteristics of the image data.

20 Claims, 7 Drawing Sheets

AUTOMATIC TUNING OF IMAGES BASED ON METADATA

BACKGROUND

The prevalence of cameras and other image capture devices continues to increase. For example, cameras may be included as part of a mobile phone, tablet computer, as a stand-alone device, used as part of a computing device (e.g., to support teleconferencing), and so on. As such, the amount and variety of images that are captured has also had a corresponding increase.

Due to this prevalence, a variety of different techniques have been developed to process image data of the images to change visual characteristics of the images. However, tastes and desires of users in regard to visual characteristics of the images may be quite different. Therefore, conventional techniques that were utilized to perform this processing that took a "one size fits all" approach to expectations regarding image processing did not address these differences and therefore could fail for users that differed from the expectations.

SUMMARY

Automatic techniques to tune images based on metadata are described. In one or more implementations, one or more tuning parameters are identified based on metadata associated with image data. Responsive to a user input, the image data is processed using one or more tuning parameters that correspond to the metadata to change one or more visual characteristics of the image data in a manner that is likely to be consistent with a user's expectations as identified from the metadata In one or more implementations, a system comprises one or more modules implemented at least partially in hardware and configured to perform operations including collecting data that describes usage of a feature, by a plurality of computing devices, that is selectable to cause processing of image data, automatically and without user intervention, using one or more tuning parameters that correspond to the metadata to change one or more visual characteristics of the image data and making one or more changes to tuning parameters that are usable to perform the processing based on the collected data.

In one or more implementations, a system comprises one or more modules implemented at least partially in hardware and configured to perform operations including processing image data using one or more tuning parameters to change one or more visual characteristics of the image data, the one or more tuning parameters based at least in part on metadata associated with the image data that describes an event or a geographic location.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Techniques may be utilized to process image data of an image, such as to adjust one or more visual characteristics of the image via a "one click" auto-tune feature to improve a photo. However, the idea of what is an "improvement" may vary greatly between users. An event type, for instance, might contribute to the differences of what is expected of an image between users and therefore what would be considered an improvement to the image. For example, users may expect photos with higher saturation in child-related events such as birthday party or elementary school picnic whereas on the other hand users might expect natural color with soft filter in high school reunions for adults.

Likewise, it has been found that differences in expectations may be observed based on geographic location. For example, users in Asian countries such as Japan and China may prefer photos with higher values of saturation and luminance. On the other hand, users in western countries such as England and United States typically prefer photos with increased natural color and split toning. Accordingly, expectations of users may also vary from one geographic location to another.

To address these different expectations, metadata may be leveraged to help determine how an image is to be improved. For example, the metadata may define a location at which an image is captured, a location of a user that is to modify an image, and so on. Likewise, metadata may also be used to define an event type, such as a sporting event or other social event such as a birthday party and so on. The metadata may then be used as a basis to alter the visual characteristics in the processing of the image data in a manner that is consistent with the user's expectations of what is an improvement. Other types of metadata may also be indicative of a variety of differences in user expectations, such as time of day, day of week, holiday, and so on. Further discussion of these and other examples may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
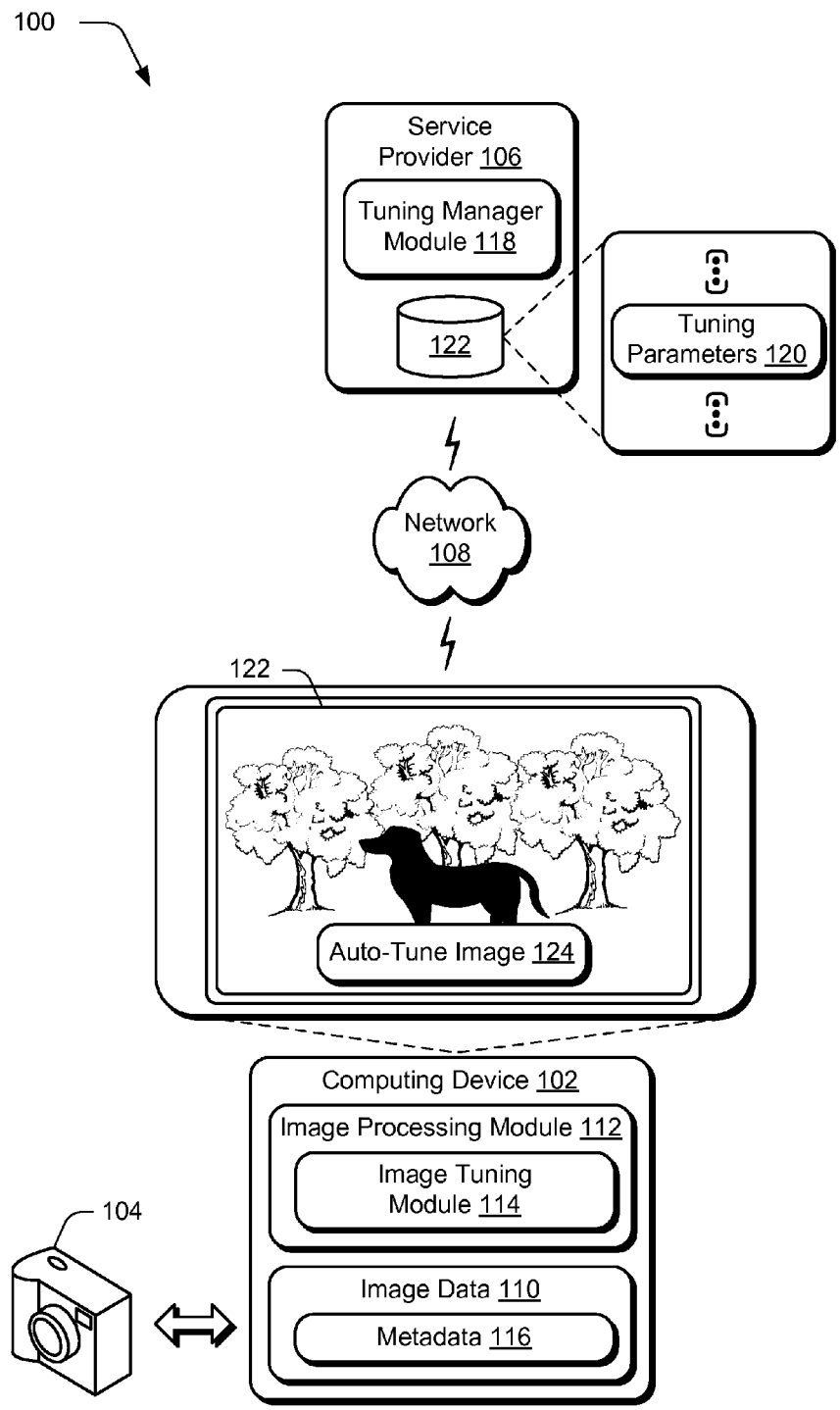
FIG. 1 is an illustration of an environment in an example implementation that is operable to employ techniques described herein.

FIG. 1 is an illustration of an environment 100 in an example implementation that is operable to employ techniques described herein. The illustrated environment 100 includes a computing device 102, an image capture device 104, and a service provider 106. The service provider 106 is illustrated as being accessible to the computing device 102 and vice versa via a network 108. These devices that implement the environment 100 may be configured in a variety of ways.

The computing device 102 and computing devices that implement the service provider 106, for instance, may be configured as a desktop computer, a laptop computer, a mobile device (e.g., assuming a handheld configuration such as a tablet or mobile phone), one or more servers, and so forth. Thus, computing devices may range from full resource devices with substantial memory and processor resources (e.g., personal computers, game consoles) to low-resource devices with limited memory and/or processing resources (e.g., mobile devices). Additionally, although a single computing device is shown in some instances, the computing devices may be representative of a plurality of different devices, such as multiple servers utilized by a business to perform operations "over the cloud" as part of a server farm for the service provider 106 as further described in relation to FIG. 7.

The image capture device 104 may also be configured in a variety of ways. Illustrated examples of one such configuration includes a standalone camera but other configurations are also contemplated, such as a video camera, scanner, copier, part of a mobile device (e.g., smart phone), and so forth. Thus, although the image capture device 104 is illustrated separately from the computing device 102, the image capture device 104 may be configured as part of the computing device, e.g., for a tablet configuration, smart phone, and so forth. The image capture device 104 may include image sensors that are each configured to form image data 110 of an image of an image scene. For example, the image sensors may be configured to capture images using a Bayer pattern or other configurations.

The image data 110 may then be processed by an image processing module 112 of the computing device 102 to modify one or more visual characteristics of the image 110. Although illustrated as part of the computing device 102, functionality of the image processing module 112 may also be implemented in a variety of ways, such as at the service provider 106 "over the cloud", distributed between the computing device 102 and another computing device, and so on.

Regardless of where and how implemented, the image processing module 112 is representative of functionality that is configured to process the image data 110. Examples of such functionality in FIG. 1 include an image tuning module 114. The image tuning module 114 is representative of functionality to process the image data 110 to change one or more visual characteristics of the image data 110. This may include leveraging metadata 116 that may be associated with the image data 110 (e.g., included along with the image data 110 as part of capture or obtained elsewhere) to determine "how" to process the image data 110.

For example, a service provider 106 may be accessible to the computing device 102 via the network 102. The service provider 102 may include a tuning manager module 118 that is representative of functionality to manage tuning parameters 120 in storage 122 that may be leveraged by the image tuning module 114 to specify how the visual characteristics of the image data 110 are to be processed.

For example, the image tuning module 114 may support output of a user interface on a display device 122 of the computing device 102. The user interface may include an option 124 that is user selectable to process the image, e.g., to "auto-tune" the image as illustrated. Responsive to a single selection of the option 124, the image tuning module 114 may utilize one or more tuning parameters 120 that correspond to metadata 116 associated with the image data 110.

As described previously, the metadata 116 may be used to determine likely expectations of a user that utilizes this functionality. The metadata 116 may be configured in a variety of ways to indicate these expectations, such as a geographic location as described in relation to FIG. 2, an event type as described in relation to FIG. 3, and other types, such as to leverage a time at which the image was captured, and so forth.

Figure 2:
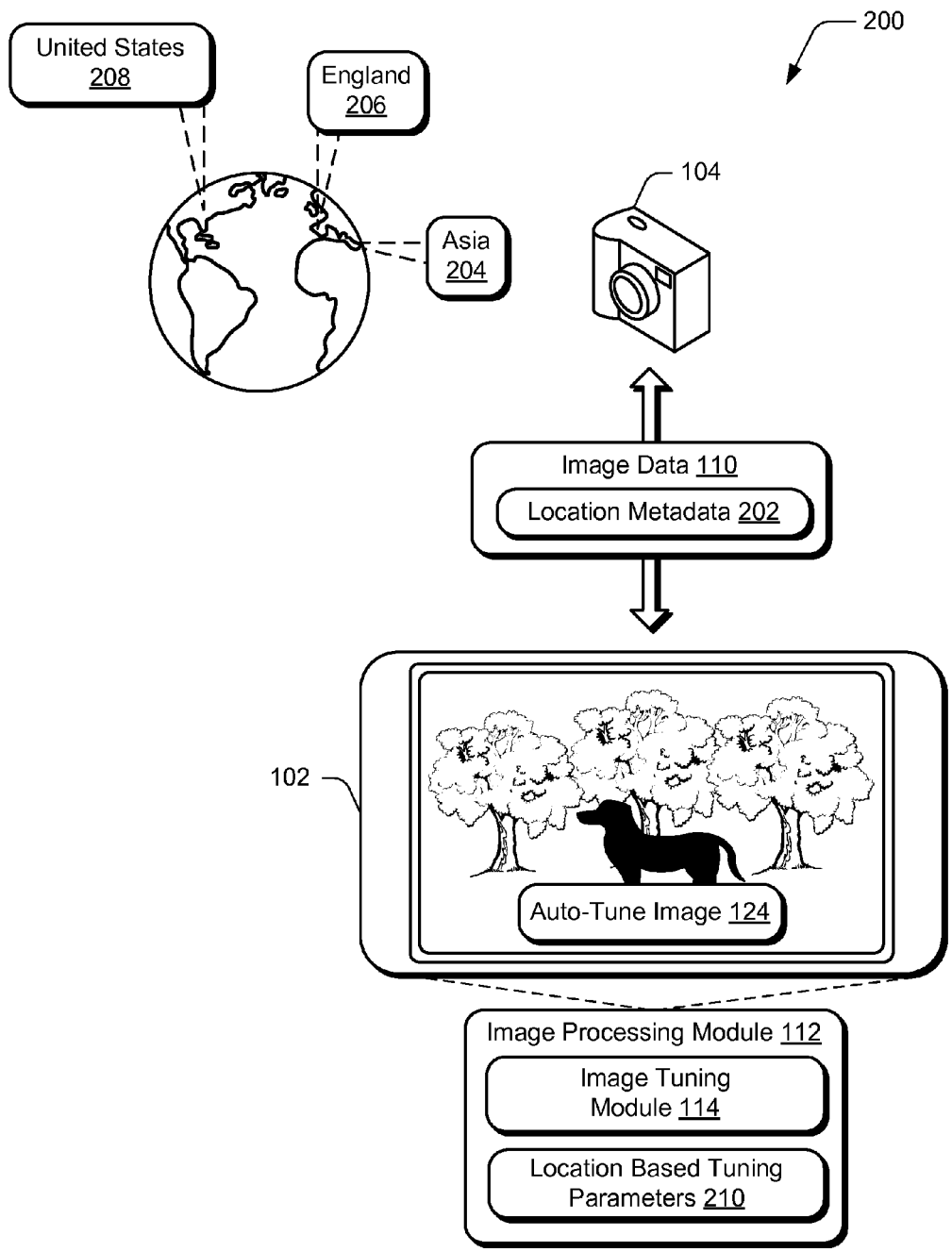
FIG. 2 depicts a system in an example implementation in which an image tuning module of FIG. 1 employs metadata that indicates a geographic location to determine likely expectations of a user to process the image data.

FIG. 2 depicts a system 200 in an example implementation in which the image tuning module 114 employs metadata that indicates a geographic location to determine likely expectations of a user to process the image data. The illustrated system 200 includes a computing device 102 and an image capture device 104 as before, which may be incorporated as a single device, multiple devices, and so on as previously described.

The image data 110 in this instance is associated with location metadata 202 that is indicative of a geographic location. A variety of different geographic locations may be associated with the image data 110. For example, the location metadata 202 may indicate a location at which the image data was captured, e.g., through use of location-determination functionality of the image capture device 104.

The location metadata 202 may also be indicative of a location at which the image data 110 is to be processed. For example, an IP address of the computing device 102 may be used as a basis to indicate a particular geographic location. The location metadata 202 may also associated with the image data 110 as part of a user's account. A user, for instance, may interact with the image tuning module 114 as part of an account with a service provider, may obtain the module from an application store, and so on. User accounts that are configured to support this interaction may include a geographic location (e.g., a work address, home address, IP address from which typically accessed, etc.) that may be used to indicate the geographic location.

Regardless of how the location metadata 202 originated, this metadata may be utilized by an image tuning module 114 to determine likely expectations of a user that requests the processing. As previously described, the location metadata 202 may be used to indicate differences in expectations that may be observed based on geographic location. For example, users in Asian 204 countries such as Japan and China may prefer photos with higher values of saturation and luminance. On the other hand, users in western countries such as England 206 and the United States 208 may prefer photos with increased natural color and split toning.

Accordingly, location based tuning parameters 210 may be leveraged by the image tuning module 114 based on the indication of geographic location by the location metadata. For example, the image data 110 may be configured as a bitmap. Luminance "L" may then be computed with brightness expressed using a variable length vector. A generic image processing technique may be used first to process the image data 110 in response to selection of the option 124 to auto-tune the image data 110, although this step may also be omitted in various implementations.

An output of the generic image processing technique may be configured as an array of a lookup table, e.g., "Lookup Table (LUT)=LUT_init [256]." Location based tuning parameters 210 may then be applied to generate variations of the lookup table based on the geographic location, e.g., "LUT_japan[256]," "LUT_england[256]," and so on. In one or more implementations, initial computation and variations may be performed separately than the application of the auto-tune feature, thus improving performance, e.g., such that processing may be performed within two seconds rather than significantly higher as was observed using conventional techniques. These variations may be stored in storage 122 as part of a service provider 106 of FIG. 1, included as part of the image tuning module 114 (e.g., different versions of an application that are made available at different locations), and so on.

Accordingly, when a user selects the option 124 to "auto-tune" the image data 110, the corresponding LUT of the location based tuning parameters 210 may be utilized accordingly, e.g., a Japanese user may leverage location based tuning parameters 210 "LUT_japan," an English user may leverage location based tuning parameters 210 "LUT_england," and so on. As a result, the image tuning module 114 may leverage location based tuning parameters 210 that are likely consistent with expectations for different users at different geographic locations.

The location based tuning parameters 210 may be obtained in a variety of ways. For example, these location based tuning parameters 210 may be obtained from the service provider 106, e.g., in response to identification of the location metadata 202 associated with the image data. In another example, these tuning parameters may be obtained as part of the image tuning module 114, e.g., downloaded with the module from an application store, received as part of an update, and so on. A variety of other examples are also contemplated as previously described, e.g., may change to coincide with how the location metadata 202 originated. Although location metadata 202 was described in this example, the metadata may take a variety of other forms, another example of which is described as follows and shown in a corresponding figure.

Figure 3:
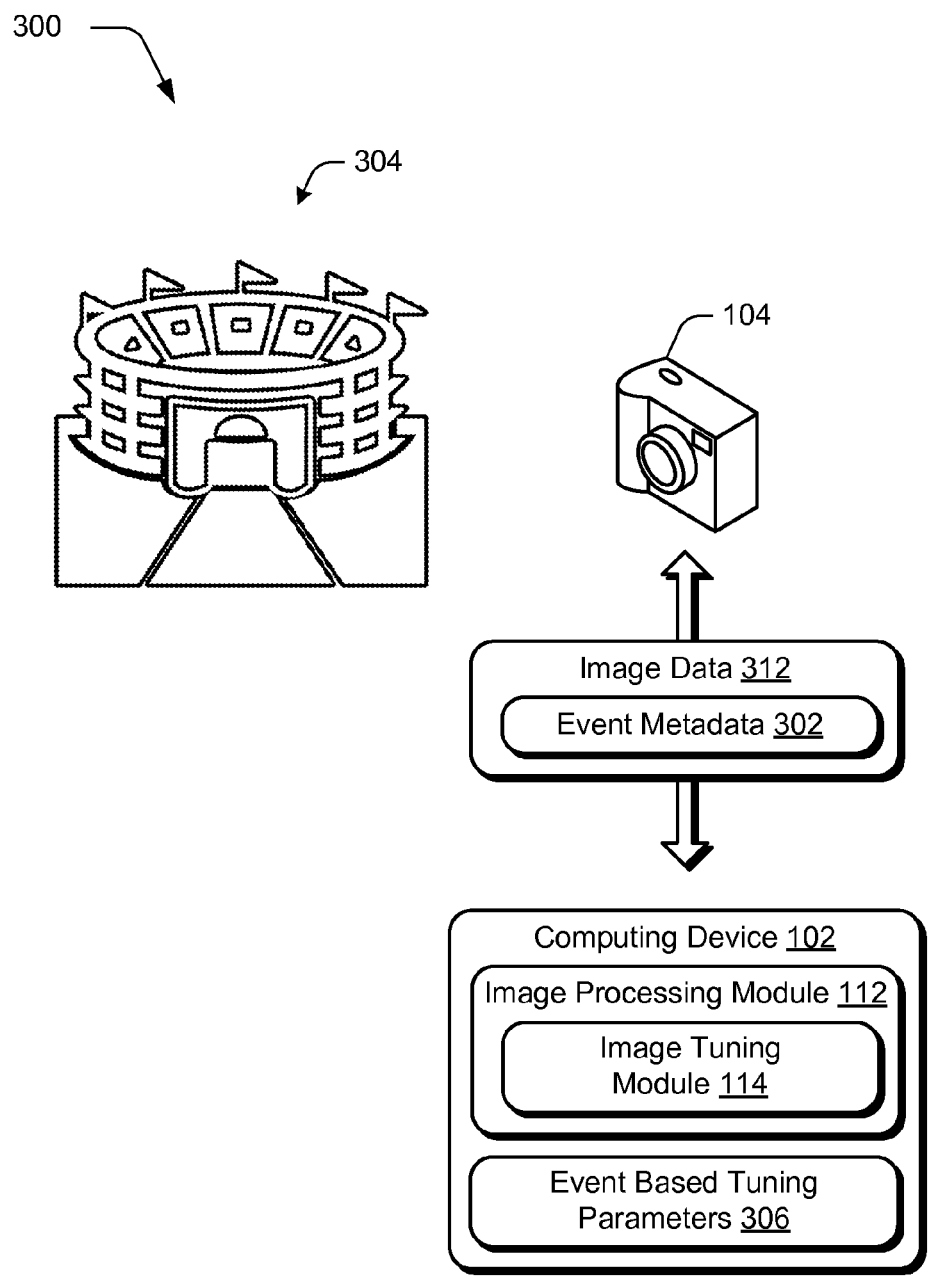
FIG. 3 depicts a system in an example implementation in which an image tuning module of FIG. 1 employs metadata that indicates an event type to determine likely expectations of a user to process the image data.

FIG. 3 depicts a system 300 in an example implementation in which the image tuning module 114 employ metadata that indicates an event type to determine likely expectations of a user to process the image data. The illustrated system 300 includes a computing device 102 and an image capture device 104 as before, which may be incorporated as a single device, multiple devices, and so on as previously described.

The image data 110 in this instance is associated with event metadata 302. The event metadata 302 may be specified in a variety of ways, such as manually by a user to enter an event type to be associated with image data 312 that is to be captured by the image capture device 104. For example, a user may manually specify a type of social event, such as sporting event 304 as illustrated, birthday party, anniversary, lecture, concert, and so on. The event metadata 302 may also be specified automatically and without user intervention, such as to leverage entries in a user's calendar such that images captured during a specified period of time in the calendar are populated with an event type (e.g., meeting description) indicated by the calendar. A variety of other examples are also contemplated, such as a lookup based on a time/location at which the image was captured, e.g., automatic Internet search.

The image tuning module 114 may then leverage the event metadata 302 to select event based tuning parameters 306 to correspond to the event type. As above, the event based tuning parameters 306 may be stored locally at the computing device 102, obtained from the service provider 106 via the network 110 of FIG. 1, and so on. The event based tuning parameters 306 may be applied as previously described, alone or in combination with the geographic based tuning parameters. Thus, a system is described in which metadata associated with an image may be utilized to determine likely expectations of a user to perform image processing, which may be used as a basis to select tuning parameters. The tuning parameters may be managed in a variety of ways, an example of which is described as follows and shown in a corresponding figure.

Figure 4:
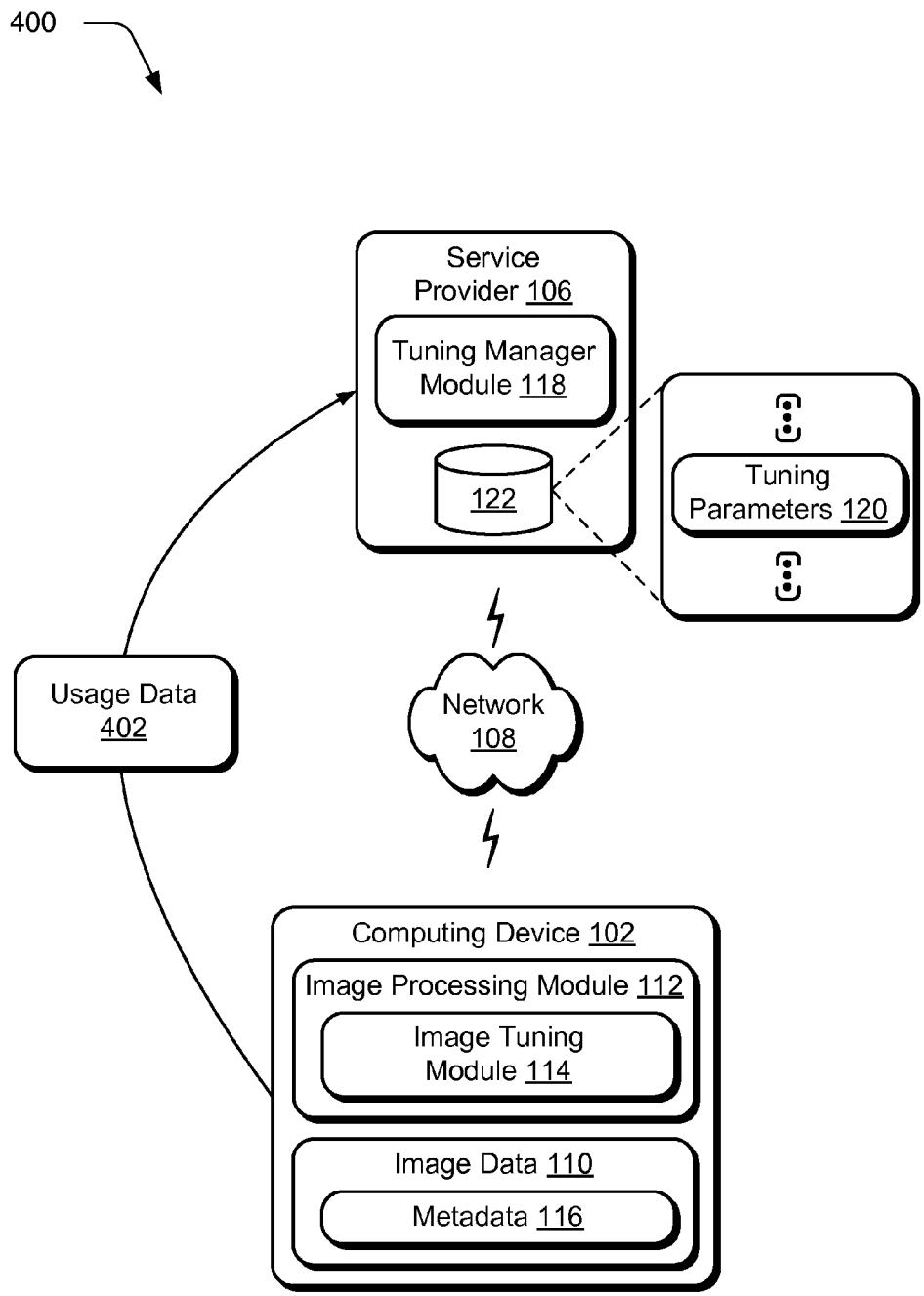
FIG. 4 depicts a system in an example implementation in which data is collected which may be leveraged by a service provider to make changes to one or more tuning parameters.

FIG. 4 depicts a system 400 in an example implementation in which data is collected which may be leveraged by a service provider to make changes to one or more tuning parameters. The system 400 in this example includes the service provider 106 and computing device 102 as before. In this example, however, the image processing module 112 is configured to generate usage data 402 that describes usage of the image tuning module 114. For example, the usage data 402 may describe how often the option 124 to auto-tune an image feature was selected. The usage data 402 may also describe subsequent processing performed after the auto-tune functionality was used. A user, for instance, may select the auto-tune function and view a result. The user may then specify subsequent changes to visual characteristics of the image through additional functionality of the image processing module 112. These changes may also be tracked as part of the usage data 402. A variety of other examples are also contemplated.

The tuning manager module 106 may then collect the usage data 402 from one or more computing devices 102 and use this information to make changes to the tuning parameters 120, e.g., make changes to a LUT. This may include making changes to the tuning parameters 120 based on whether the image tuning module 114 was used as well as changes indicated by subsequent processing typically performed by users of the image tuning module 114. These changes may then be exposed for usage by the respective image tuning modules 114 of the computing devices 102. In this way, improvements may be made in a manner that is transparent to a user. A variety of other examples are also contemplated, further discussion of which may be found in relation to the following procedures.

Example Procedures

The following discussion describes automatic tuning techniques of images based on metadata that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

Figure 5:
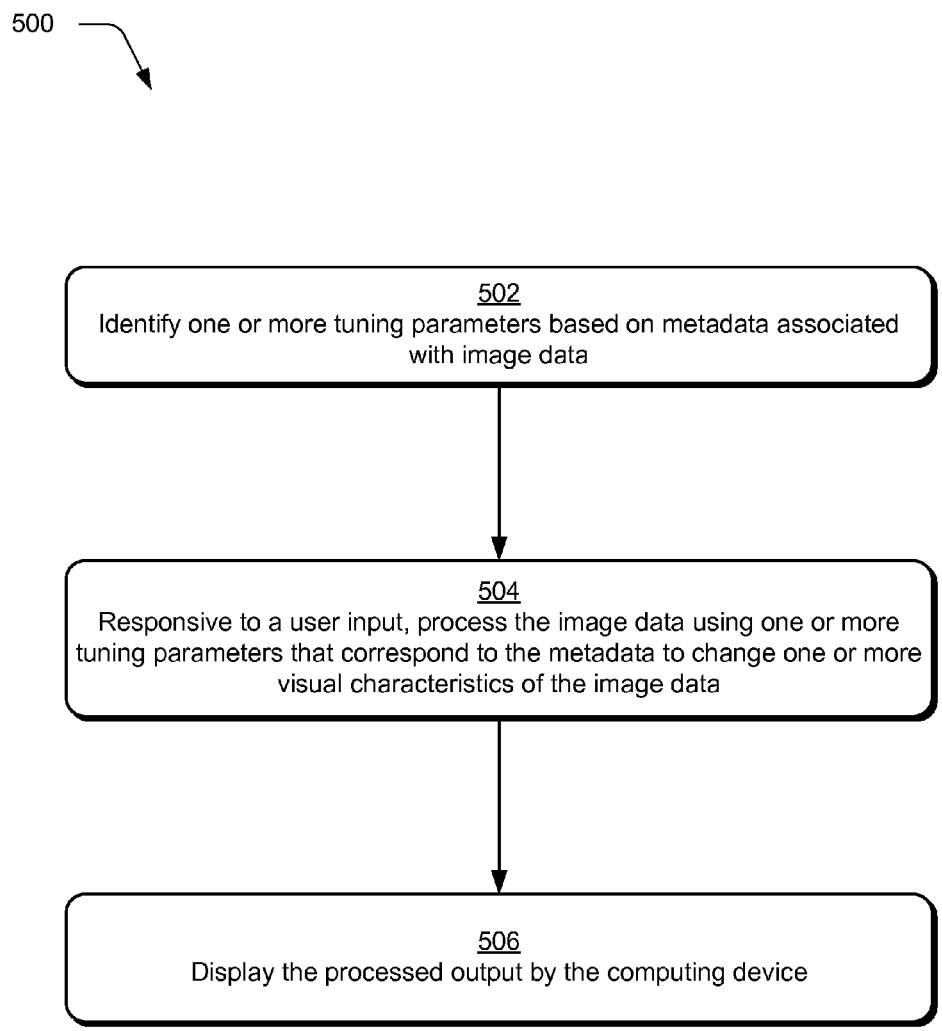
FIG. 5 is a flow diagram depicting a procedure in an example implementation in which image data is processed using tuning parameters that are selected based on metadata associated with image data.

FIG. 5 depicts a procedure 500 in an example implementation in which image data is processed using tuning parameters that are selected based on metadata associated with image data. One or more tuning parameters are identified based on metadata associated with image data (block 502). As previously described, the metadata may be associated in a variety of ways, such as captured with the image, associated with a computing device that performs the processing, a user's account, and so on. Further, the metadata may describe a variety of different characteristics that may be usable to identify a user's expectations, e.g., event, geographic location, time of day, and so on.

Responsive to a user input, the image data is processed using one or more tuning parameters that correspond to the metadata to change one or more visual characteristics of the image data (block 504). This may include use of a lookup table (LUT) to modify a bitmap, and so on. Further, the tuning parameters may be selected responsive to identification of the metadata (e.g., for a particular event), may be encoded as part of the module and disseminated based on the metadata (e.g., distribute the module to particular geographic locations), and so forth. The processed output is then displayed by the computing device (block 506), e.g., output on the display device 122. Subsequent modifications may then be made to further process the image, which may be used as a basis to make modifications to the feature as further described in the following discussion and corresponding figure.

Figure 6:
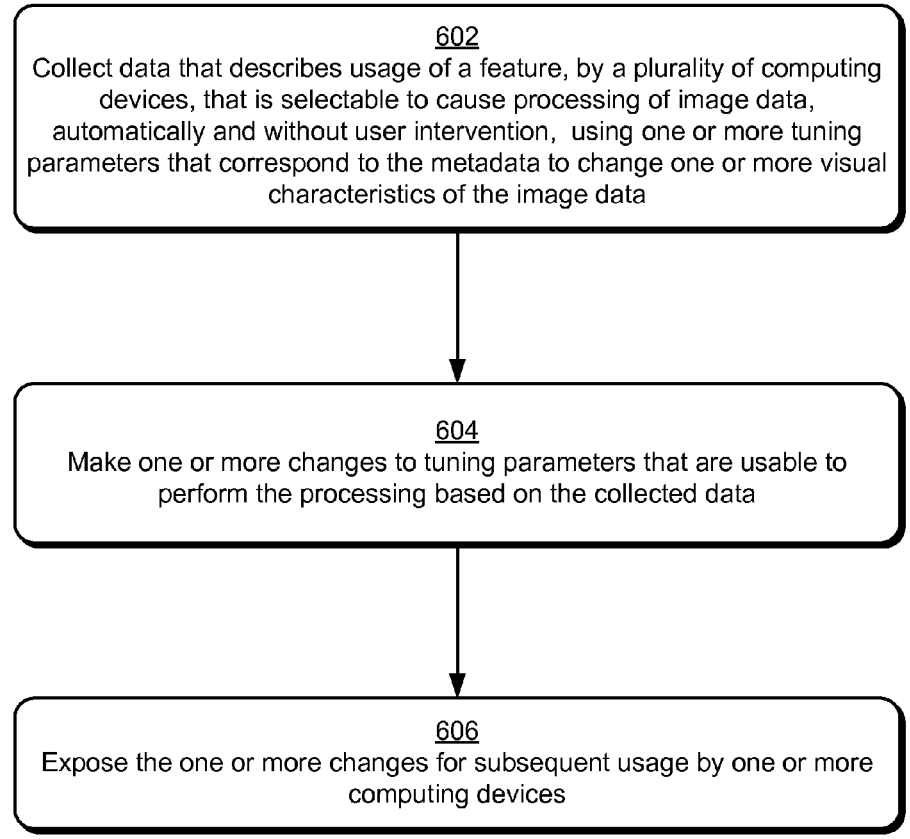
FIG. 6 is a flow diagram depicting a procedure in an example implementation in which data is collected to make changes to tuning parameters for use by an image tuning module.

FIG. 6 depicts a procedure 600 in an example implementation in which data is collected to make changes to tuning parameters for use by an image tuning module. Data is collected that describes usage of a feature, by a plurality of computing devices, that is selectable to cause processing of image data, automatically and without user intervention, using one or more tuning parameters. The one or more tuning parameters correspond to the metadata and are usable to change one or more visual characteristics of the image data (block 602). The data may be configured as usage data 402 that describes whether the feature was used, subsequent processing performed after usage of the feature, and so on.

One or more changes are made to tuning parameters that are usable to perform the processing based on the collected data (block 604). The service provider 106, for instance, may utilize subsequent processing to change a LUT to be consistent with that processing, such that subsequent processing that was typically performed by a user is now performed automatically as part of the auto-tune feature, for instance. Other examples are also contemplated, such as to make changes based on lack of utilization of the feature, to forgo changes based on popularity of the feature for certain users (e.g., geographic locations), and so on.

The one or more changes are exposed for subsequent usage by one or more computing devise (block 606). This may be performed using updates, exposure of a "new" module, and so forth. A variety of other examples are also contemplated.

Example System and Device

Figure 7:
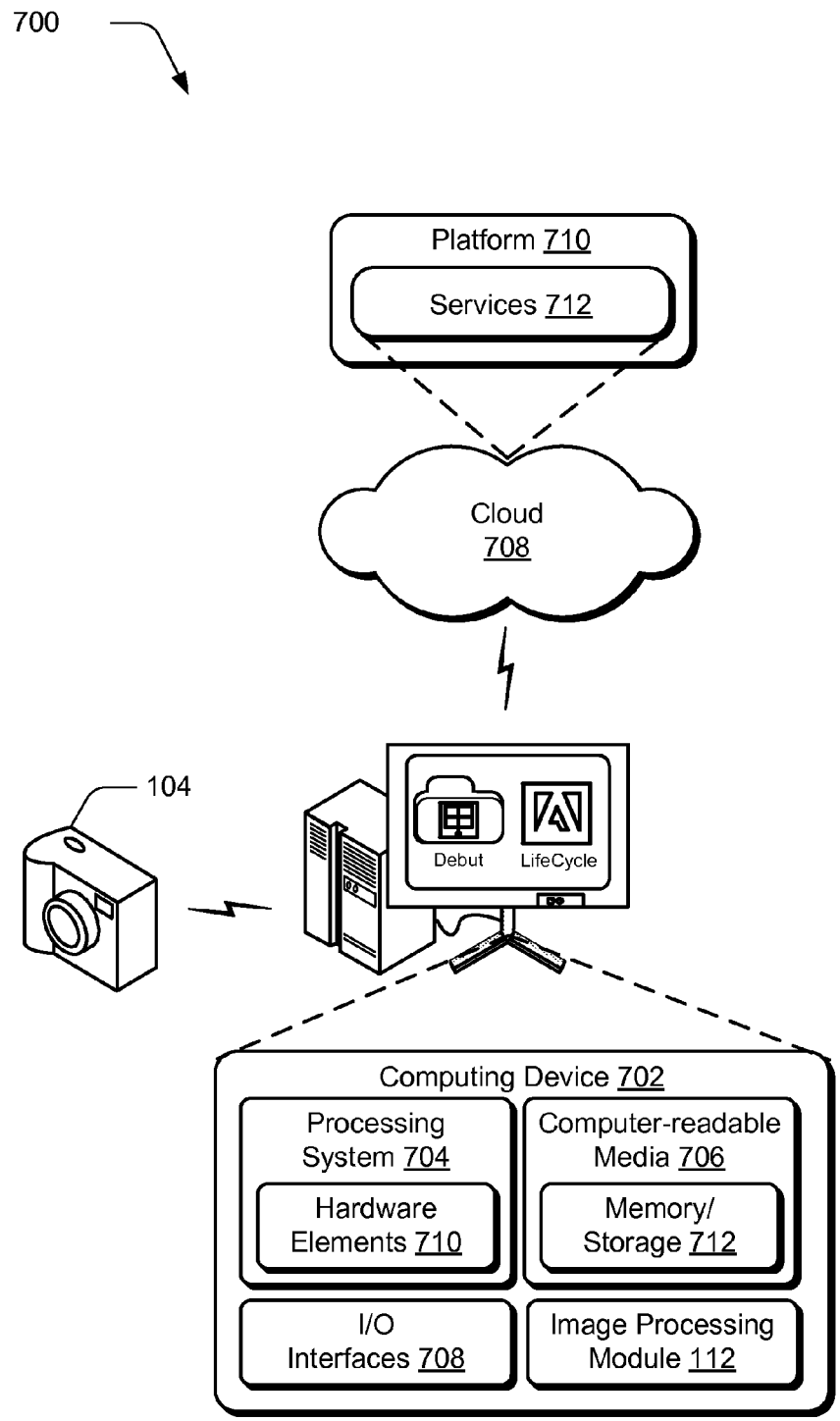
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. An example of this is illustrated through inclusion of the image processing module 112 and image capture device 104 of FIG. 1. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 720 via a platform 722 as described below.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of functionality described herein may be distributed throughout the system 700. For example, the functionality may be implemented in part on the computing device 702 as well as via the platform 722 that abstracts the functionality of the cloud 720.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented at a computing device using metadata and processing image data based on the metadata, the method comprising:
   identifying one or more tuning parameters by the computing device based at least in part on metadata associated with a geographic location associated with a user's account of a service provider that originates the one or more tuning parameters, the metadata being identified independent of a geographic location at which the image data is captured; and
   responsive to a user input, processing the image data by the computing device using the one or more tuning parameters that correspond to the metadata to change one or more visual characteristics of the image data in a manner that is likely to be consistent with a user's expectations based on the geographic location associated with the user's account.

2. A method as described in claim 1, wherein the metadata that references the geographic location associated with the user's account is captured along with the image data to describe a geographic location at which the image data is captured.

3. A method as described in claim 1, wherein the metadata also references a geographic location of the computing device at which the image data is to be processed.

4. A method as described in claim 3, wherein the metadata that also references the geographic location of the computing device is captured along with the image data to describe a geographic location at which the image data is captured.

5. A method as described in claim 1, wherein the one or more tuning parameters are not selected manually by a user.

6. A method as described in claim 1, further comprising selecting the one or more tuning parameters from a plurality of tuning parameters, each associated with a respective geographic location, the selecting one or more tuning parameters performed based on the geographic location.

7. A method as described in claim 1, wherein the metadata additionally references an event and the one or more tuning parameters are chosen at least in part based on the referenced event.

8. A method as described in claim 1, wherein the event is a social event that includes a sporting event, birthday, concert, speech, lecture, outdoor event, or anniversary.

9. A method as described in claim 1, wherein the metadata is specified manually by a user.

10. A method as described in claim 1, wherein the metadata is specified automatically and without user intervention.

11. A method as described in claim 1, wherein the metadata is specified based at least in part on a user's calendar.

12. A method as described in claim 1, further comprising obtaining an application that is executable to perform the identifying and the processing, the obtaining of the application performed at least in part based on the geographic location.

13. A method as described in claim 1, further comprising applying generic processing to the image data that is not dependent on the metadata and wherein the processing is performed using a result of the generic processing.

14. A system comprising one or more modules implemented at least partially in hardware and configured to perform operations including processing image data using one or more tuning parameters to change one or more visual characteristics of the image data, the one or more tuning parameters identified based at least in part on metadata associated with a geographic location associated with a user's account of a service provider that originates the one or more tuning parameters, the geographic location associated with the user's account independent of a geographic location associated with the image data.

15. A system as described in claim 14, wherein the metadata is specified automatically and without user intervention.

16. A system as described in claim 14, wherein the metadata that references the geographic location associated with the user's account is:
  captured additionally along with the image data to describe a geographic location at which the image data is captured; or
  a geographic location associated with the computing device that performs the identifying and the processing.

17. A system as described in claim 14, further comprising selecting the one or more tuning parameters from a plurality of tuning parameters, each associated with a respective said geographic location associated with the user's account or event, the selecting the one or more tuning parameters performed based on the geographic location associated with the user's account or the event.

18. A system comprising one or more modules implemented at least partially in hardware and configured to perform operations including:
  collecting data that describes usage of a feature, by a plurality of computing devices, that is selectable to cause processing of image data automatically and without user intervention using one or more tuning parameters identified based on metadata associated with a geographic location associated with a user's account of a service provider that originates the one or more tuning parameters of one or more of the plurality of computing devices to change one or more visual characteristics of the image data automatically and without user intervention, the geographic location associated with the user's account being independent of a geographic location associated with the image data; and
  making one or more changes to the one or more identified tuning parameters that are usable to perform the processing based on the collected data.

19. A system as described in claim 18, wherein the collected data describes whether or not the feature is used.

20. A system as described in claim 18, wherein the collected data describes subsequent processing specified by a user to image data after performance of the processing to the image data.

* * * * *